United States Patent
Jones et al.

(10) Patent No.: US 10,641,172 B2
(45) Date of Patent: May 5, 2020

(54) BIFURCATED AIR INLET HOUSING FOR A MINIATURE GAS TURBINE ENGINE

(71) Applicant: UNITED TECHNOLOGIES CORPORATION, Hartford, CT (US)

(72) Inventors: Anthony C. Jones, San Diego, CA (US); Patrick M. Lydon, San Marcos, CA (US); Nagamany Thayalakhandan, San Diego, CA (US); Eric J. Alexander, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 1005 days.

(21) Appl. No.: 14/774,933

(22) PCT Filed: Mar. 26, 2014

(86) PCT No.: PCT/US2014/031828
§ 371 (c)(1),
(2) Date: Sep. 11, 2015

(87) PCT Pub. No.: WO2014/165364
PCT Pub. Date: Oct. 9, 2014

(65) Prior Publication Data
US 2016/0025005 A1    Jan. 28, 2016

Related U.S. Application Data

(60) Provisional application No. 61/807,359, filed on Apr. 2, 2013.

(51) Int. Cl.
*F02C 7/04* (2006.01)
*F02C 7/06* (2006.01)
(Continued)

(52) U.S. Cl.
CPC ............. *F02C 7/04* (2013.01); *B64D 33/02* (2013.01); *F02C 3/04* (2013.01); *F02C 7/06* (2013.01);
(Continued)

(58) Field of Classification Search
CPC ..... F02C 7/04; F02C 3/04; F02C 7/06; B64D 33/02; B64D 2033/0273; F05D 2220/323;
(Continued)

(56) References Cited

U.S. PATENT DOCUMENTS 2,618,119 A   11/1952   Redding et al.
3,056,258 A   10/1962   Marchant et al.
(Continued)

OTHER PUBLICATIONS

Supplementary European Search Report for European Application No. 14778145.4 completed Mar. 21, 2016.
(Continued)

*Primary Examiner* — Aaron R Eastman
(74) *Attorney, Agent, or Firm* — Carlson, Gaskey & Olds, P.C.

(57) ABSTRACT

A gas turbine engine has a nose cone with a nose cone upstream end and an inlet housing including a plurality of separate flow paths at a housing upstream end which is downstream of the nose cone upstream end. The inlet housing includes a mixing portion downstream of the housing upstream end which mixes airflow from the separate flow paths, such that the airflow is generally around 360 degrees of a rotational axis of the gas turbine engine. A rotor and a turbine drive a shaft to drive the rotor with the shaft including a bearing mounted at a location downstream of the nose cone upstream end.

10 Claims, 3 Drawing Sheets

(51) Int. Cl.
  *B64D 33/02* (2006.01)
  *F02C 3/04* (2006.01)

(52) U.S. Cl.
  CPC ............... *B64D 2033/0273* (2013.01); *F05D 2220/323* (2013.01); *F05D 2250/51* (2013.01); *F05D 2250/80* (2013.01); *F05D 2250/82* (2013.01)

(58) Field of Classification Search
  CPC ............. F05D 2250/51; F05D 2250/80; F05D 2250/82
  USPC ........................................................ 415/185
  See application file for complete search history.

(56) References Cited

U.S. PATENT DOCUMENTS

| | | |
|---|---|---|
| 4,598,544 A | 7/1986 | Williams et al. |
| 4,938,021 A | 7/1990 | Jones et al. |
| 5,150,569 A * | 9/1992 | Chapman ............... F02C 3/04 244/135 R |
| 5,529,263 A | 6/1996 | Rudolph |
| 7,762,057 B2 | 7/2010 | Solan et al. |
| 2007/0095033 A1 | 5/2007 | Snyder |
| 2008/0283677 A1 | 11/2008 | Pederson et al. |
| 2010/0051756 A1* | 3/2010 | Leland ................... B64D 33/02 244/53 B |

OTHER PUBLICATIONS

International Search Report from PCT counterpart application PCT/US14/31828, filed Mar. 26, 2014.
International Preliminary Report on Patentability for International Application No. PCT/US2014/031828 dated Oct. 15, 2015.

* cited by examiner

BIFURCATED AIR INLET HOUSING FOR A MINIATURE GAS TURBINE ENGINE

CROSS-REFERENCE TO RELATED APPLICATION

This application claims priority to U.S. Provisional Application No. 61/807,359, filed Apr. 2, 2013.

BACKGROUND OF THE INVENTION

This application relates to a bifurcated inlet for delivering air into a gas turbine engine.

Gas turbine engines and typically include a compressor compressing air, and delivering it into a combustor. The air is mixed with fuel and ignited. Products of this combustion pass downstream over turbine rotors, driving them to rotate, and in turn rotate the compressor.

Miniature gas turbine engines are known and may be defined as engines supplying 180 lbf. of thrust or less, or may also be defined as being of an axial length less than 15 inches (38.1 centimeters). Such miniature gas turbine engines are utilized to power small aircraft, such as drones or missiles.

Historically, a miniature gas turbine engine is mounted within a fuselage of the aircraft. A single scoop inlet in the fuselage delivered air into a compressor section. More recently, it has been proposed to have a bifurcated inlet, having two scoop inlets through the housing. In the known aircraft, there are two separate flow paths leading from the two scoop inlets, and reaching a duct that combines the flow into a single cylindrical flow before it reaches the engine.

This has sometimes resulted in an unduly long space required on the aircraft for mounting the engine.

SUMMARY

In a featured embodiment, a gas turbine engine has a nose cone including a nose cone upstream end. An inlet housing includes a plurality of separate flow paths at a housing upstream end, which is downstream of the nose cone upstream end. The inlet housing includes a mixing portion downstream of the housing upstream end, which mixes airflow from separate flow paths. A rotor and a turbine drive a shaft to drive the rotor. The shaft includes a bearing mounted at a location downstream of the nose cone upstream end. The airflow generally surrounds 360 degrees of a rotational axis of the gas turbine engine.

In another embodiment according to the previous embodiment, the gas turbine engine is a miniature gas turbine engine.

In another embodiment according to any of the previous embodiments, the gas turbine engine delivers less than or equal to 180 lbf. of thrust.

In another embodiment according to any of the previous embodiments, the gas turbine engine is of an axial length less than 15 inches (38.1 centimeters) in length from the upstream end to a downstream end.

In another embodiment according to any of the previous embodiments, there are two of the plurality of separate flow paths.

In another embodiment according to any of the previous embodiments, the inlet housing defines two spaced flow areas to separate the separate flow paths. The flow areas have semi-cylindrical radially inner boundaries and generally rectangular radially outer boundaries. Two spaced flow areas are separated by webs, which support the bearing within an outer housing portion.

In another featured embodiment, an aircraft has a fuselage including at least two scoop inlets for delivering inlet air to an included gas turbine engine. The gas turbine engine includes a nose cone including a nose cone upstream end. The inlet housing includes at least two separate flow paths at a housing upstream end which is downstream of the nose cone upstream end. The inlet housing includes a mixing portion downstream of the housing upstream end which mixes airflow from the separate flow paths. A rotor and a turbine drive a shaft to drive the rotor. The shaft includes a bearing mounted at a location downstream of the nose cone upstream end. The airflow generally surrounds 360 degrees of a rotational axis of the gas turbine engine.

In another embodiment according to the previous embodiment, the gas turbine engine is a miniature gas turbine engine.

In another embodiment according to any of the previous embodiments, the gas turbine engine delivers less than or equal to 180 lbf. of thrust.

In another embodiment according to any of the previous embodiments, the gas turbine engine is of an axial length less than 15 inches (38.1 centimeters) in length from the upstream end to a downstream end.

In another embodiment according to any of the previous embodiments, there are two of the plurality of separate flow paths.

In another embodiment according to any of the previous embodiments, the inlet housing defines two spaced flow areas to separate the separate flow paths. The flow areas have semi-cylindrical radially inner boundaries and generally rectangular radially outer boundaries. The two spaced flow areas are separated by webs which support the bearing within the outer housing portion.

These and other features may be best understood from the following drawings and specification.

DETAILED DESCRIPTION

Figure 1:
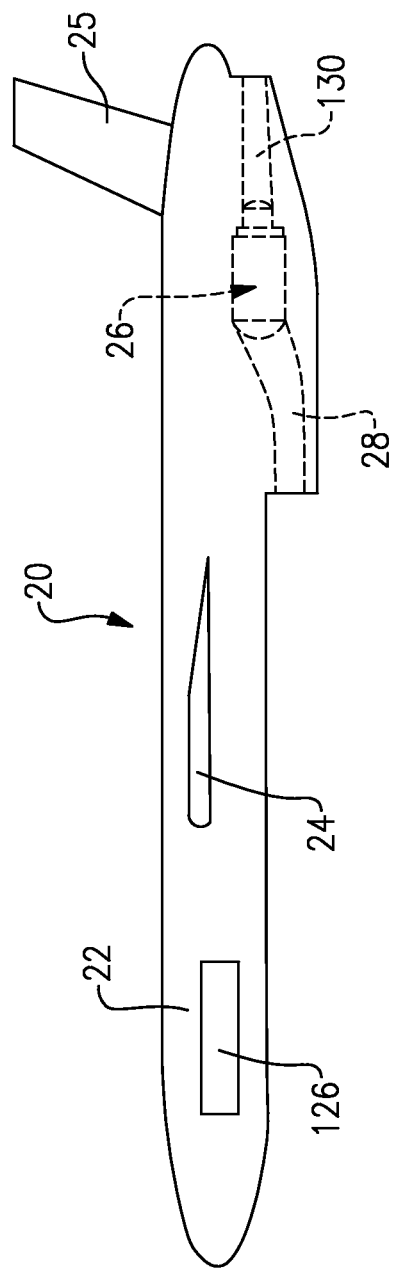
FIG. 1 shows a prior art aircraft.

An aircraft 20 is illustrated in FIG. 1 and includes an aircraft body or fuselage 22, and aerodynamic guide structures, such as wings 24 and tail 25. A payload 126 is included on the vehicle 20 and may be a missile or communication equipment, such as may be utilized on an unmanned drone. In the prior art FIG. 1, there was one scoop inlet 28. An engine 26 may be a miniature gas turbine engine, and scoop inlet 28 extends through the fuselage 22 to deliver air to the engine 26. A nozzle 130 is downstream of engine 26.

A miniature gas turbine engine may be defined as an engine delivering less than or equal to 180 lbf. of thrust, and/or it may also be defined as being of an axial length less than 15 inches (38.1 centimeters) in length from an upstream end of the engine to a downstream end. While the teachings of the disclosure extend to any gas turbine engine application, it has particular value for a miniature gas turbine engine.

Figure 2:
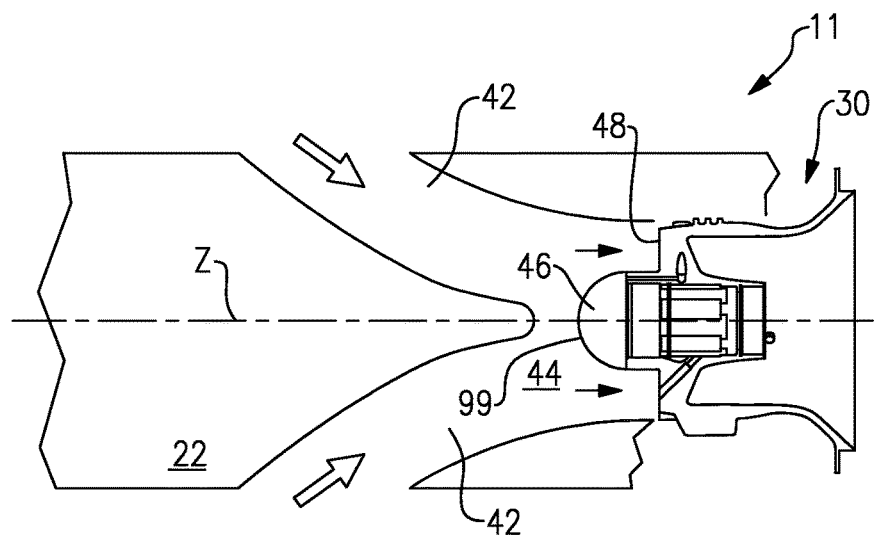
FIG. 2 shows a prior art inlet arrangement.

As shown in FIG. 2 in another prior art aircraft 11, there were two scoop inlets 42 through the fuselage 22 delivering air to an engine 30. The engine 30 has a nose cone 46 defining an upstream end 99 of the engine 30. The two scoop inlets 42 deliver air downstream to merge into a common cylindrical airflow path at 44, at a location upstream of upstream end 99 of the nose cone 46. Thus, when the airflow reached an inlet 48 to the engine 30, the airflow was already across a full 360 degree area about an engine rotational axis Z.

This has sometimes resulted in the requirement for a long axial length for the aircraft 11 to receive or mount engine 30.

Figure 3:
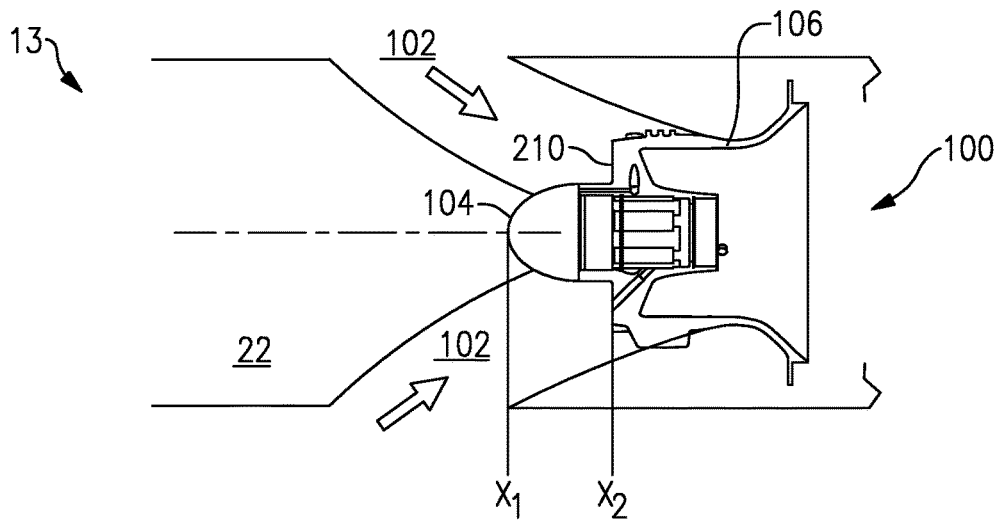
FIG. 3 shows an inlet arrangement according to an embodiment.

FIG. 3 shows the disclosed engine 100 mounted within the fuselage 22 of an aircraft 13. As shown, the nose cone 104 has an upstream end at $X_1$. The airflow from the scoop inlets 102 reaches a location $X_2$ downstream of the upstream end of the nose cone 104, and is still separate. Location $X_2$ is the inlet to the engine 100. An inlet housing 106 has an upstream end 210 downstream of the upstream end $X_1$ to define the inlet to the engine 100. The inlet housing 106 mixes the flow from the two separate flows into a common flow over 360 degrees about an engine rotational axis Y.

The novel inlet housing 106 results in an aircraft 13 that requires a shorter overall length to mount the engine 100. Said another way, the distance from the scoop inlets 102 to engine 100 is shorter than between the FIG. 2 prior art scoop inlets 42 and engine 30.

Figure 4:
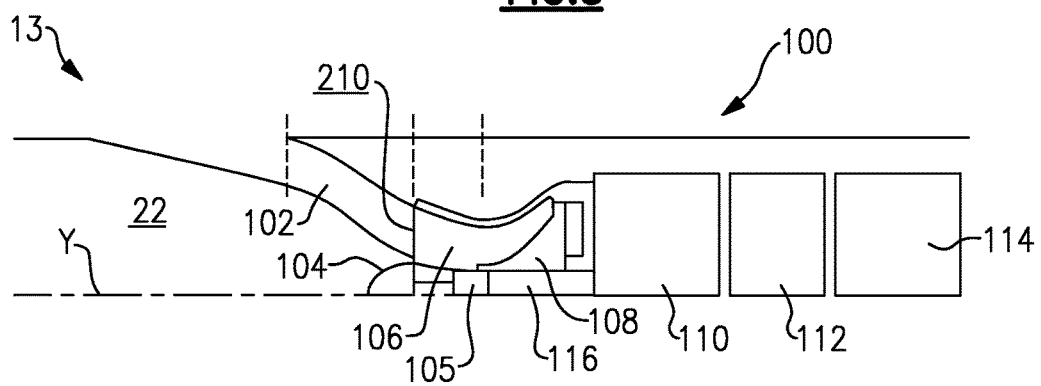
FIG. 4 is a cross-sectional view through an engine and aircraft, in an embodiment.

FIG. 4 shows the fuselage 22 and the engine 100 somewhat schematically. The inlet housing 106 is positioned upstream of a first rotor stage 108. The first rotor or impeller 108 is driven by a shaft 116. The engine 100 may include a compressor section 110 delivering compressed air into a combustor section 112, and products of the combustion pass downstream over a turbine rotor 114. The turbine rotor 114 will drive the shaft 116 to rotate the rotor 108 and rotors in the compressor 110.

As shown, a bearing 105 mounts shaft 116 adjacent to the nose cone 104.

Figure 5A:
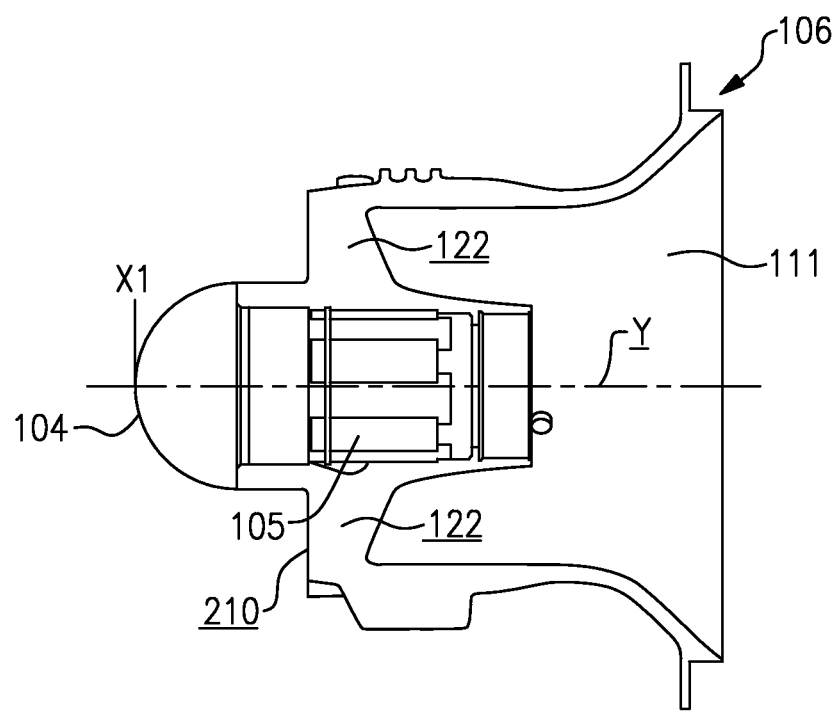
FIG. 5A shows one portion of an inlet housing, according to an embodiment.

As shown in FIG. 5A, the nose cone 104 extends from upstream end $X_1$, which is upstream of the bearing 105. The inlet housing 106 has a full flow portion 111 which extends about 360 degrees around axis Y and is reached by the airflow prior to the airflow reaching the rotor 108 (see FIG. 4).

Figure 5B:
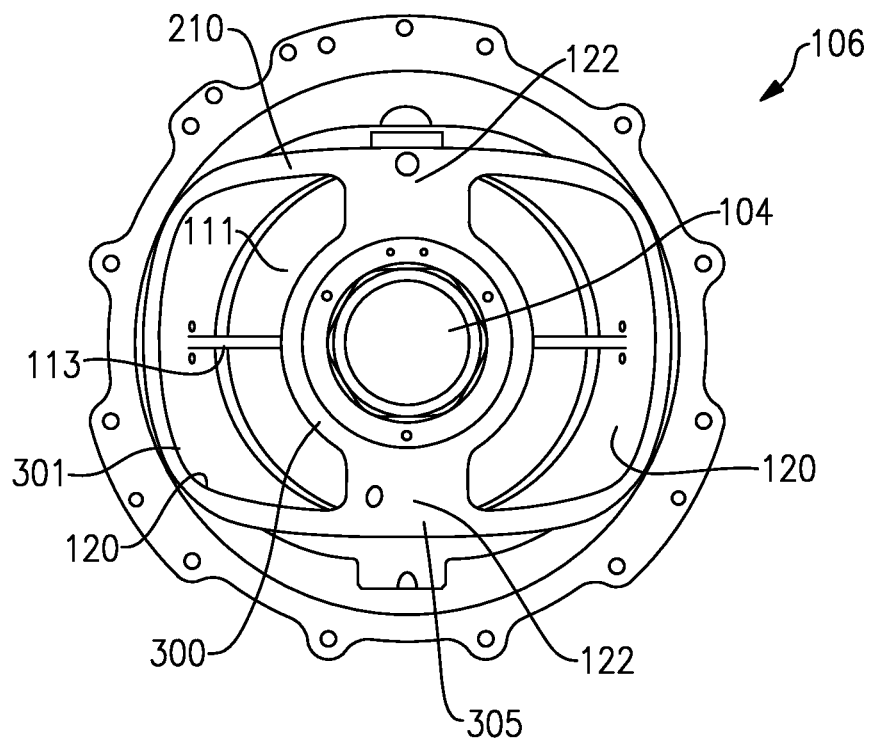
FIG. 5B shows another view of the FIG. 5A inlet, according to an embodiment.

As shown in FIG. 5B, the inlet housing 106 has separate inlet flow areas 120, each to be associated with one of the scoop inlets 102, and downstream of the upstream end $X_1$ of the nose cone 104. Thus, when the air reaches the inlet housing 106, it is still maintained as two separate airflows.

As can be seen in FIG. 5A, the full flow portion 111 is spaced downstream and serves to mix the air such that when the air reaches the impeller 108, it will be a full flow around 360 degrees about axis Y.

Stated another way, the airflow within the engine 100 is maintained as two separate circumferentially spaced airflows in the separate inlet flow areas 120, separated by housing portions or webs 122. Downstream of the upstream end 210 of inlet housing 106, the airflows mix, such that the airflow is generally about 360 degrees about a rotational axis Y of the engine 100. Of course, various struts may be placed within the airflow, such as shown schematically at 113 in FIG. 5B, so that the airflow is not necessarily completely over 360 degrees. However, the air from the two separate airflows in the separate inlet flow areas 120 does not mix until reaching the area 111, within the inlet housing 106 and at a location downstream of the point $X_1$.

The inlet housing 106 defines two spaced and separate inlet flow areas 120, with semi-cylindrical radially inner portions 300 and generally rectangular outer portions 301. Of course, other shapes may be used. The two spaced flow areas are separated by webs 122 that support a bearing (105, see FIG. 4) within an outer housing portion 305.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a nose cone including a nose cone upstream end and an inlet housing including a plurality of separate flow paths at a housing upstream end which is downstream of said nose cone upstream end, said inlet housing including a mixing portion downstream of the housing upstream end which mixes airflow from separate flow paths; and
   a rotor and a turbine driving a shaft to drive the rotor, said shaft including a bearing mounted at a location downstream of said nose cone upstream end;
   wherein the airflow in the mixing portion generally surrounds 360 degrees of a rotational axis of the gas turbine engine; and
   wherein said gas turbine engine is a miniature gas turbine engine.

2. The gas turbine engine as set forth in claim 1, wherein said gas turbine engine delivers less than or equal to 180 lbf. of thrust.

3. The gas turbine engine as set forth in claim 1, wherein said gas turbine engine is of an axial length less than 15 inches (38.1 centimeters) in length from said upstream end to a downstream end.

4. The gas turbine engine as set forth in claim 1, wherein there are two of said plurality of separate flow paths.

5. The gas turbine engine as set forth in claim 4, wherein said inlet housing defines two spaced flow areas to separate said separate flow paths, with said flow areas having semi-cylindrical radially inner boundaries and generally rectangular radially outer boundaries, and said two spaced flow areas separated by webs, which support said bearing within an outer housing portion, and said mixing portion is downstream of said webs.

6. An aircraft comprising:
   a fuselage including at least two scoop inlets for delivering inlet air to an included gas turbine engine;
   said gas turbine engine including a nose cone including a nose cone upstream end, and an inlet housing including at least two separate flow paths at a housing upstream end which is downstream of said nose cone upstream end, said inlet housing including a mixing portion downstream of the housing upstream end which mixes airflow from the separate flow paths; and
   a rotor and a turbine driving a shaft to drive the rotor, with said shaft including a bearing mounted at a location downstream of said nose cone upstream end;
   wherein the airflow in the mixing portion generally surrounds 360 degrees of a rotational axis of the gas turbine engine; and
   wherein said gas turbine engine is a miniature gas turbine engine.

7. The aircraft as set forth in claim 6, wherein said gas turbine engine delivering less than or equal to 180 lbf. of thrust.

8. The aircraft as set forth in claim 6, wherein said gas turbine engine is of an axial length less than 15 inches (38.1 centimeters) in length from said upstream end to a downstream end.

9. The aircraft as set forth in claim 6, wherein there are two of said plurality of separate flow paths.

10. The aircraft as set forth in claim 9, wherein said inlet housing defines two spaced flow areas to separate said separate flow paths, with said flow areas having semi-cylindrical radially inner boundaries and generally rectangular radially outer boundaries, and said two spaced flow areas separated by webs which support said bearing within said outer housing portion and said mixing portion is downstream of said webs.

\* \* \* \* \*